UNITED STATES PATENT OFFICE.

GEORGE H. HERBERT, OF ST. PETERSBURG, FLORIDA.

LIQUID AUTOMOBILE AND FURNITURE POLISH.

1,411,353.  Specification of Letters Patent.  Patented Apr. 4, 1922.

No Drawing.  Application filed November 18, 1921. Serial No. 516,140.

*To all whom it may concern:*

Be it known that I, GEORGE H. HERBERT, a citizen of the United States, residing at St. Petersburg, in the county of Pinellas and State of Florida, have invented certain new and useful Improvements in Liquid Automobile and Furniture Polish, of which the following is a specification.

This invention relates to liquid polishes for automobile bodies and furniture, and to the process of preparing the same.

The object of the invention is to provide a material which will give a polish capable of receiving and keeping a high lustre and one which will withstand the action of the elements.

One of the features of the polish of this invention is that dust does not tend to adhere to the polished surface, and rain and frequent washings do not spot the polish, or dull it so quickly as present known polishes are affected.

One satisfactory formula for making the liquid polish of this invention includes the use of the following materials and quantities mentioned by weight:

| | |
|---|---|
| Oxychloride of bismuth | ½ to 1 ounce. |
| Flake white | ½ to 1 ounce. |
| Gum acacia varnish | 1 ounce. |
| Coloring matter (dye) | ½ ounce. |
| Turpentine | 3 ounces. |
| Apple vinegar | 2 ounces. |
| Lustrous oil and perfume | 1½ ounces. |
| Water | 20–22 ounces. |

This is sufficient for the preparation of a puart of polish, and larger quantities may be prepared by correspondingly increasing the amounts of each ingredient.

The unusual results are due in part to the use of the specific materials and also in part to the fact that these materials are used together in a single liquid preparation. The oxychloride of bismuth and the flake white are powders which serve to provide two different types of surface layers and preservers. The gum acacia varnish may be prepared from gum acacia mixed with turpentine, linsed oil and olive oil as solvents and diluents. The turpentine is a quick drying solvent, and the vinegar serves to remove the old dirt from the surface treated. A pure non-oxidizing vegetable or fish oil may be used as the lustrous oil provided it gives a shiny and lustrous finish, and the perfume may be provided by the material known as oil of bergamot, which is added to counteract the odors and render the polish pleasing to the smell. It has been found that a very satisfactory non-injurious combination of odorous material and lustrous oil is provided by the material known as brilliantine. Brilliantine is sold generally by pharmacists and is known to contain such oils and perfumes as sperm oil, spermaceti wax, castor oil, olive oil, oil of bitter almonds, oil of cloves, and oil of bergamot. The odor of the sperm or the olive oil may be counteracted by the more pleasant odor of the oil of cloves or oil of bergamot. The dye, preferably a red water dye, such as the recognized Diamond Dye, is mixed with the water and this mixture then thoroughly mixed with the other ingredients. The dye provides a quick setting coloring matter which provides an attractive appearance for the liquid, but which does not materially affect the color of the resultant dry finish.

The combined use of the bismuth, vinegar and turpentine gives particularly advantageous results as a combined surface layer, cleaner, and quick drier, giving a corresponding quick, clean and lustrous finish.

The material is applied to the surface free from dust with the usual soft cloth and thoroughly wiped off to remove the dirt loosened thereby. Then a clean piece of cloth is used to apply a shining coat to the surface thus previously cleaned, and the shining coat is rubbed gently until the surface begins to dry and brightens, after which no more rubbing is necessary. The surface should then be permitted to dry for at least 10 minutes.

The resultant finish will withstand the action of soap and water, sea air and rain, and will generally resist the action of automobile cleaning materials and greases.

I claim:

1. A liquid polishing material consisting of oxychloride of bismuth, flake white, gum acacia, coloring matter, turpentine, apple vinegar, lustrous oil, and a perfume and water.

2. A liquid polishing material consisting of the following quantities by weight of—

| | |
|---|---|
| Oxychloride of bismuth | ½ to 1 ounce. |
| Flake white | ½ to 1 ounce. |
| Gum acacia varnish | 1 ounce. |
| Coloring matter (dye) | ½ ounce. |
| Turpentine | 3 ounces. |
| Apple vinegar | 2 ounces. |
| Lustrous oil and perfume | 1½ ounces. |
| Water | 20–22 ounces. |

3. In a liquid polishing material the combination of oxychloride of bismuth, vinegar, and turpentine.

4. In a liquid polishing material the combination of flake white, oxychloride of bismuth, vinegar, and a quick drying hydrocarbon solvent.

In testimony whereof I affix my signature.

GEORGE H. HERBERT.